Sept. 1, 1953  H. H. HOADLEY  2,650,752
BOUNDARY LAYER CONTROL IN BLOWERS
Filed Aug. 27, 1949  5 Sheets-Sheet 2
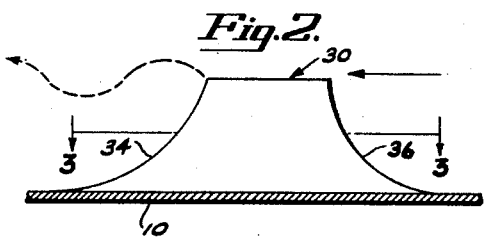
*Fig. 2.*
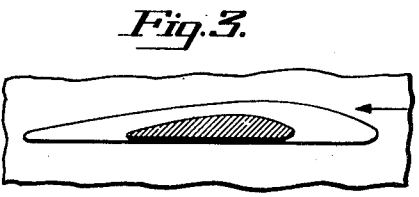
*Fig. 3.*
*Fig. 4.*
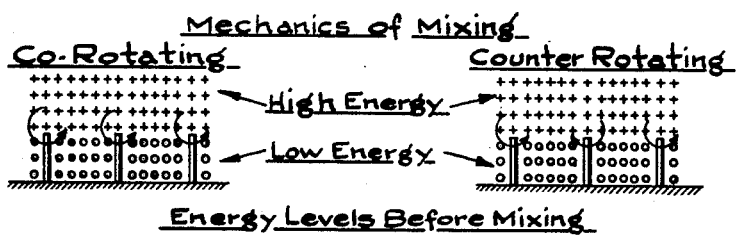
Mechanics of Mixing
Energy Levels Before Mixing
Energy Distribution During Mixing
Energy Distribution After Mixing
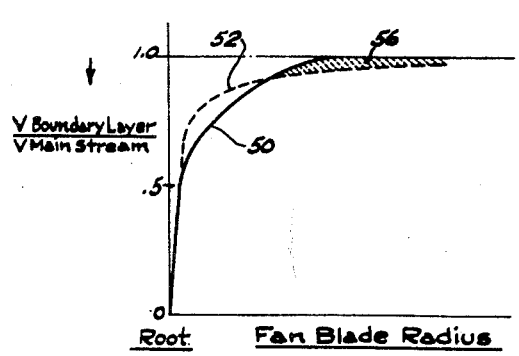
*Fig. 6.*
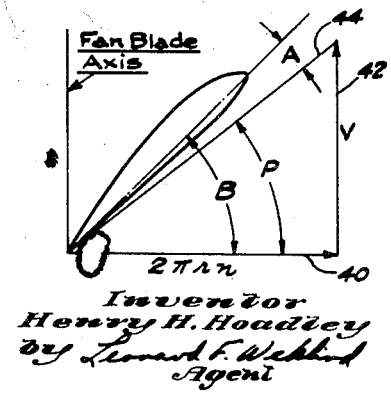
*Fig. 5.*
Inventor
Henry H. Hoadley
by Leonard F. Wehhof
Agent

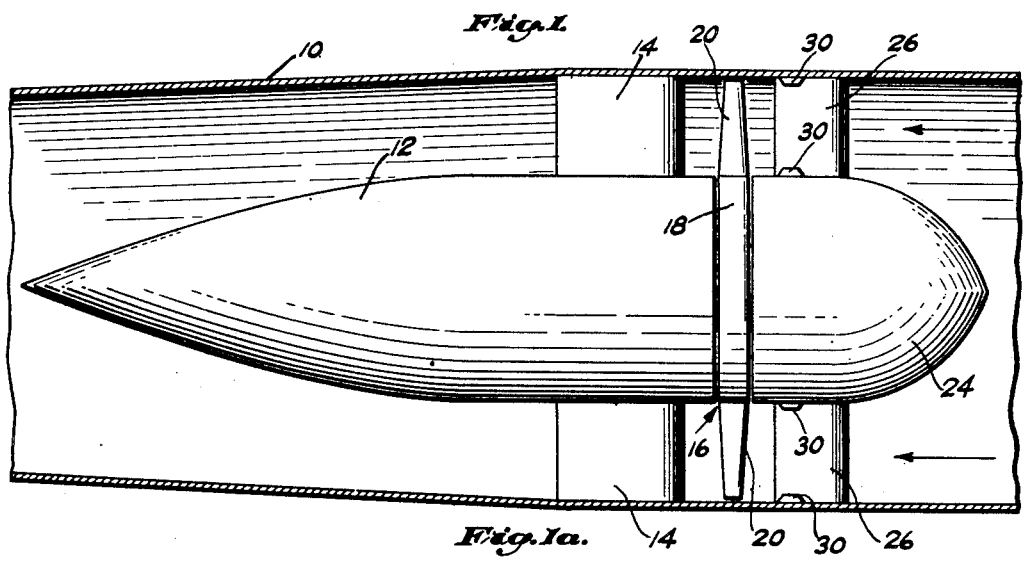
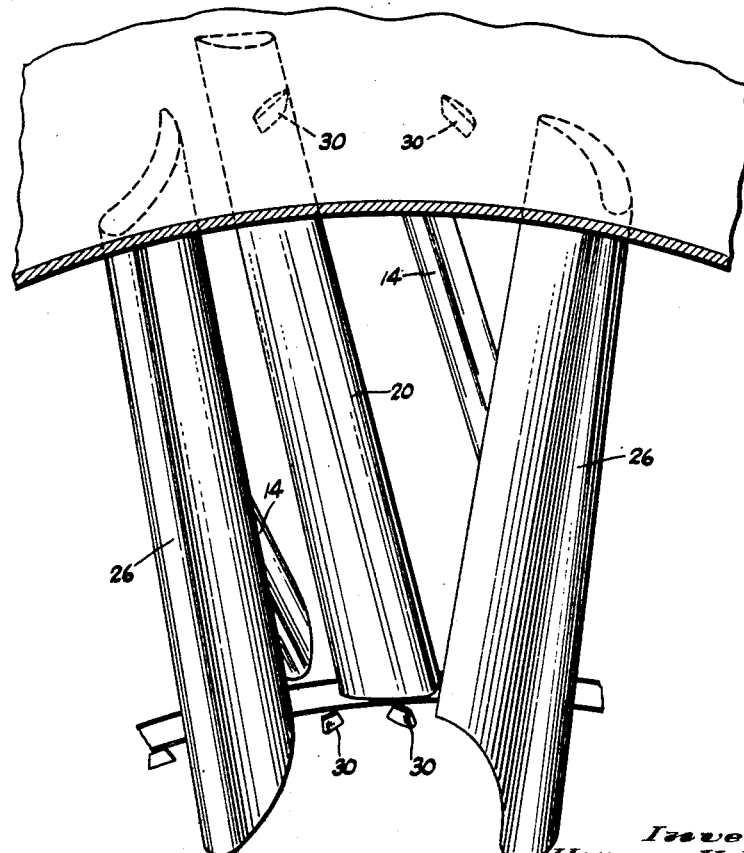

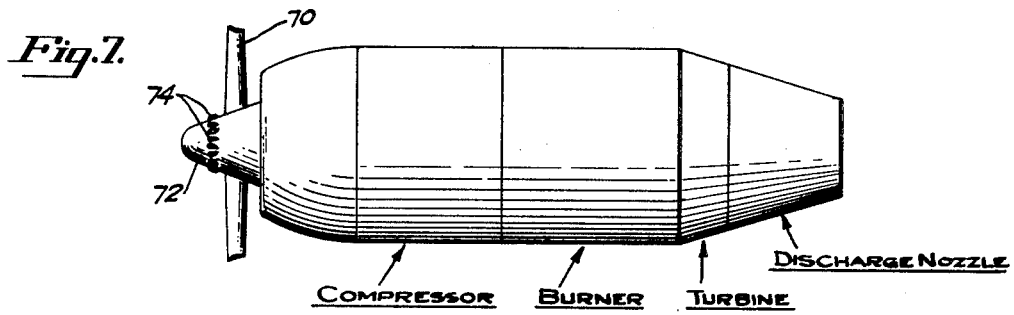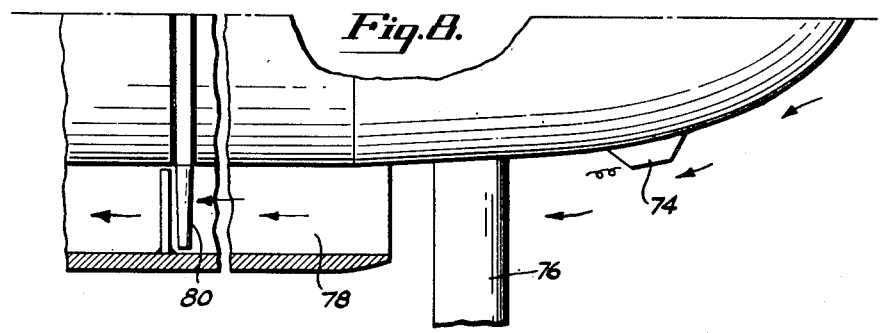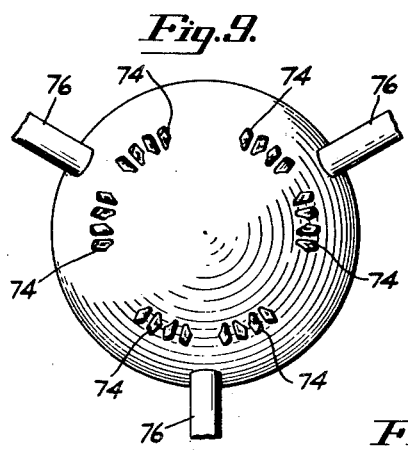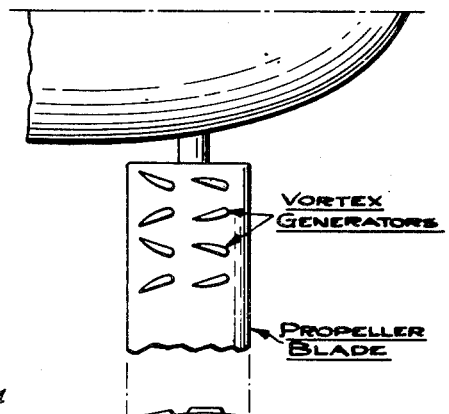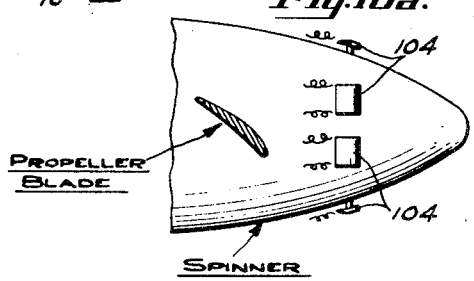

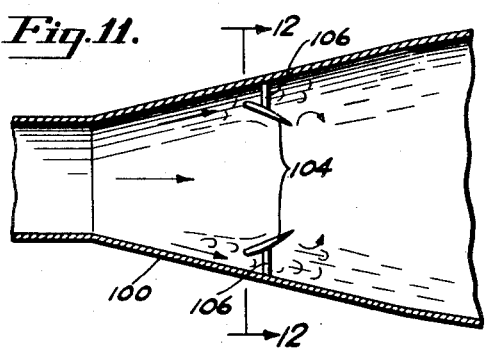
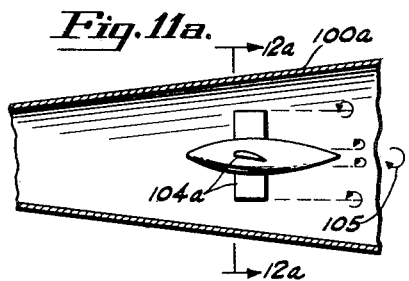
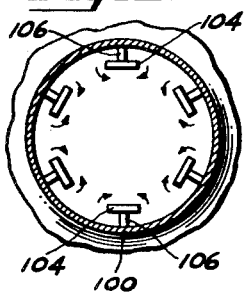
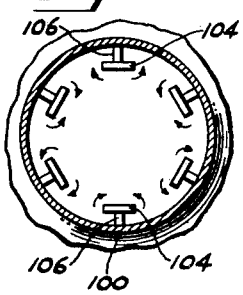
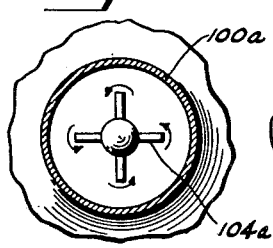
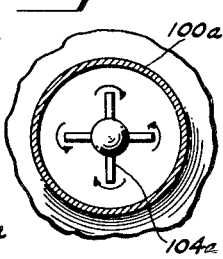
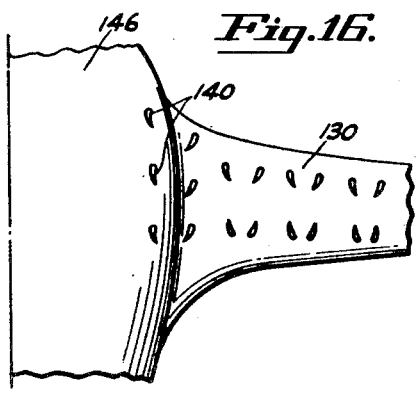
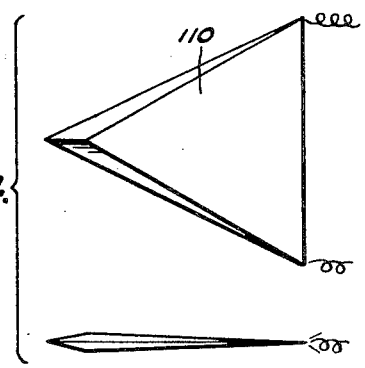
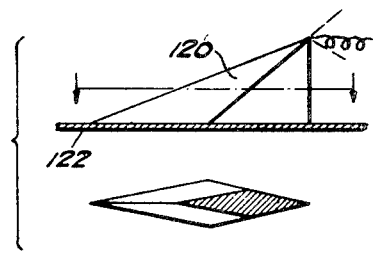

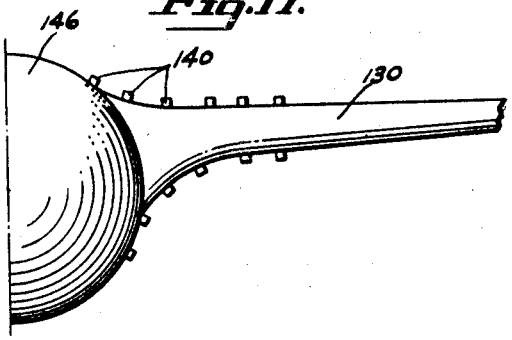
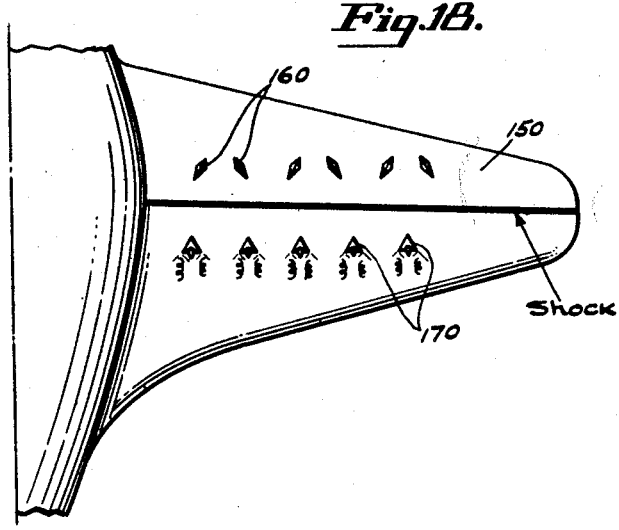
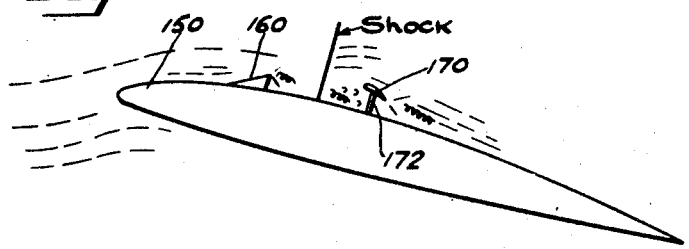

Patented Sept. 1, 1953

2,650,752

UNITED STATES PATENT OFFICE 2,650,752

BOUNDARY LAYER CONTROL IN BLOWERS

Henry H. Hoadley, Manchester, Conn., assignor to United Aircraft Corporation, East Hartford, Conn., a corporation of Delaware Application August 27, 1949, Serial No. 112,723

1 Claim. (Cl. 230—120)

This invention relates to means for improving the flow of fluids over fluid confining surfaces such as the walls of diffusers, wind tunnels and the like and over similar confining surfaces such as airfoils and streamline bodies; and has as one of its primary objects the provision of planned intermixing of fluid particles where such particles have varied energy levels as for example in a main fluid stream which has a retarded boundary layer adjacent its confining surface, the boundary layer being in the state of either separated or unseparated flow.

Another object of this invention is to increase the overall efficiency of a wind tunnel fan by energizing boundary layer air adjacent the root and tip sections of the fan blades and thereby decreasing the effective angle of attack of the blades and generally improving flow characteristics.

A further object of this invention is to provide similar energy transfer to increase the velocity of the boundary layer and thereby retard fluid separation from the confining surface and to recover separated flow where such fluid conditions exist.

A still further object of this invention is to provide improved means for transferring energy in the manner stated above where normal shock waves occur which tend to produce separation in fluids having velocities approaching the speed of sound.

Another object of this invention is to provide vortex generating airfoils having high critical velocities for insuring adequate energy transfer by the generation of planned vortices in fluids having velocities closely approaching Mach number 1 and above.

Another object of this invention is to provide improved means for transferring energy from the main fluid stream, which flows over a confining surface or through a passage, to the retarded boundary layer which moves adjacent the confining surface.

These and other objects will become readily apparent from the following detailed description of the drawings in which:

Fig. 1 is a partial cross section of a portion of a wind tunnel indicating the fan and associated equipment;

Fig. 1a is a perspective view, in partial section, of the pre-rotation vanes and vortex generators as viewed from the upstream side of the wind tunnel fan housing;

Fig. 2 is a side elevation of one type of vortex generating airfoil utilized in this invention;

Fig. 3 is a cross sectional view taken along the line 3—3 of Fig. 2;

Fig. 4 is a schematic illustration of the transfer of energy as caused by the vortex generators;

Fig. 5 is a diagrammatic view of the aerodynamic components of a section of a fan blade during operation;

Fig. 6 is a diagrammatic illustration of the velocity distribution along the span of a fan blade as affected by this invention;

Fig. 7 is a schematic view of a turbine driven propeller indicating a vortex generator installation on the spinner according to this invention;

Fig. 8 is a detailed view in partial cross section of a portion of Fig. 7;

Fig. 9 is a front view of the propeller spinner of Fig. 7;

Fig. 10 is a partial view of a propeller blade and spinner indicating the use of vortex generators on the shank of the propeller blade;

Fig. 10a is a side elevation of a portion of a propeller spinner indicating a modified type of vortex generator mounted thereon;

Figs. 11, 12 and 13 are cross sectional views indicating modified methods of utilizing the vortex generating principles of this invention in a diffuser;

Figs. 11a, 12a and 13a are sectional views indicating the use of vortex generators mounted on a streamline body for controlling transverse velocity distribution in a duct or a diffuser;

Fig. 14 indicates a plan and side view of a modified type of vortex generator having high critical velocities;

Fig. 15 indicates a modified vortex generator of the type shown in Fig. 14;

Figs. 16 and 17 indicate the use of vortex generators on the main wing of the airplane and on the fuselage adjacent the wing junction; and Figs. 18 and 19 illustrate the use of vortex generators of the type shown in Figs. 14 and 15 for delaying and recovering separation due to shock over a fluid confining surface of airfoil shape.

Boundary layer control has been found to be particularly important in increasing the efficiency of and improving fluid flow over airfoil shaped confining surfaces such as aerodynamic lifting surfaces, propeller blades, diffusers, ducts and the like. Although various methods have been utilized in the past for controlling the boundary layer fluid adjacent a confining surface over which a main stream is adapted to flow, a majority of such methods depend upon adding fluid or energy to the main stream from an outside source. Another conventional method includes the use of various suction devices for removing the boundary layer from adjacent the confining surface and thereby subtracting from the total energy of the entire confined fluid stream.

This invention deals with boundary layer control and energization whereby the total energy of the entire stream of fluid is maintained substantially constant and has particular reference to improvements and specific adaptations of this basic principle which includes in part the use of vortex generators as shown and described in the copending patent application Serial No. 769,042 entitled Fluid Mixing Device, filed August 16, 1947, now U. S. Patent No. 2,558,816, by Hendrik Bruynes.

Referring to Fig. 1, a portion of a wind tunnel 10 is shown having a motor 12 including its streamline casing mounted centrally of the tunnel by means of radially extending streamline struts 14. The motor 12 drives a fan 16 which includes a hub 18 and a plurality of variable pitch blades 20 which terminate in blade tips adjacent the inner walls of the tunnel. A streamline body 24 is mounted upstream from the fan 16 by means of struts 26 for directing fluid around the hub 18 and through the blades 20. The struts 26 may have their chord lines set at an angle to the axis of flow so as to impart rotation to the fluid prior to its movement through the fan blades 20. The struts 26 are referred as to pre-rotation vanes while the struts 14 are termed straightening vanes.

In a wind tunnel of the type shown it has been found that upon high rotational speeds of the fan, turbulence and other aerodynamic changes take place so that the capacity horsepower cannot be utilized efficiently when high test section velocities or high Mach numbers are desired. It has been determined that during high fluid velocity conditions the retarded boundary layer air adjacent the wall of the tunnel and adjacent the streamline body 24 caused poor flow efficiencies at the tips of the blade 20 and further caused stalled conditions to develop adjacent the root of the blades 20 over a range of as high as 30 percent of the blade radius.

To this end a plurality of vortex generators 30 are peripherally spaced between the struts 26 on the walls of the tunnel 10 and on the fluid confining outer surface of the streamline body 24.

For normally high fluid velocities, i. e., for velocities of high subsonic Mach numbers, the vortex generators 30 may comprise vanes of airfoil shape having the configuration shown in Figs. 2 and 3 wherein the leading and trailing edges 34 and 36 respectively are curved to the extent whereby the product of the length of the chord at any section along the span of the blade times the boundary layer velocity at that point will remain a constant. It must be recognized, however, that since the boundary layer velocity immediately adjacent the confining surface approaches zero, the leading and trailing edges of the vortex generator would theoretically have to merge with the surface at an infinite point upstream or downstream in order that the foregoing statement be exactly true. However, due to the inaction of the fluids in this vicinity this is of no particular concern and in no way derogates from the efficiency of the vortex generators as utilized in this invention. Normally the vortex generators terminate in tips adjacent the imaginary surface separating the main fluid stream and the boundary layer stream and have their chordwise dimension inclined relative to the axis of flow either in the same direction to produce adjacent co-rotating vortices or adjacent vortex generators may be oppositely inclined to produce adjacent counterrotating vortices. It is to be understood, of course, that the boundary layer stream has a curved velocity distribution ranging from a near zero value immediately adjacent the confining surface to a value substantially equivalent to the average velocity of the main fluid stream. In this manner and as a result of the curvature of the leading and trailing edges of the vortex generator, only a tip vortex is generated thereby. The strength of this vortex depends upon the velocity of the fluid, the airfoil section being utilized and the angle of inclination of the vortex generator relative to the axis of fluid flow. By utilizing vortex generators of the type described, the resultant vortices will have their axes of rotation substantially along the line separating the boundary layer from the main fluid stream to cause a combination of intermixing and displacement of the fluid particles between the two streams so that the particles having relatively high and low energy levels will be rearranged as they travel downstream thereby resulting in a higher average energy level within the boundary layer than previously existed upstream from the vortex generator. As will be more clearly pointed out hereinafter, this increase in energy level of the boundary layer results also in a slight reduction in the energy level of the main fluid stream.

An example of the interchange of energy between the main stream and the boundary layer during various stages of intermixing is schematically shown in Fig. 4. An examination of the various stages of mixing in Fig. 4 reveals that the mixing action is primarily caused by displacement. Further, the comparison as between co-rotating and counterrotating vortices illustrates that the counterrotating configuration provides more efficient mixing. It is here that it becomes further apparent that as a result of this method of mixing, i. e., displacing the energy of the fluid next to the wall or confining surface, the energy of the boundary layer is increased at the expense of the energy in the free stream.

The vortex generators 30 which are shown mounted on the streamline body 24 in Fig. 1 increase the efficiency of the root section of the fan blades 20 in a manner best represented in Figs. 5 and 6. It is well known that the operating conditions for a fan blade element may be resolved into graphical representations as indicated in these figures. In Fig. 5 for example the vector 40 represents the rotational velocity of the blade element while the vector 42 represents the forward velocity and the vector 44 represents the resultant velocity of the blade element. It is then apparent that B is the blade setting, P is the pitch or advance angle of the blade element, and A is the angle of attack of the blade element. For a fixed pitch blade the angle B is constant so that the variable defining the angle of attack is the forward velocity as indicated by the vector 42. Thus by utilizing the vortex generating principle for energizing the boundary layer as described above and for a given pitch setting of the fan blades, the increased forward velocity of the air relative to the fan blades results in a decrease in the effective fan blade angle of attack and eliminates stalled conditions adjacent the root section of the blade. Fig. 6 illustrates the ratio of the velocity of the boundary layer to that of the velocity of the main stream plotted at intervals from the root and moving outwardly along the span of the fan blade; solid line 50 indicating the above velocity ratio without the use of vortex generators and the dotted line 52 representing the above velocity ratio with vortex generators installed for example as shown in Fig. 1. Fig. 6 is therefore indicative of the fact that the total energy of the entire main stream remains substantially constant and that the energy of the boundary layer portion is increased while the energy of the remaining stream is decreased slightly as shown by the shaded area 56. Although the energy of that portion of the stream outside the boundary layer is slightly reduced, the overall efficiency of the fan blade root section and tip section is sufficiently enhanced so that the total efficiency through the fan and the tunnel becomes higher.

This method of increasing the efficiency of a fan as described above is applicable to propeller spinners for increasing the efficiency of the root section of the propeller blades and more particularly where the propeller is driven by a turbo-prop power plant. Fig. 7 shows a typical power plant having compressor and burner sections, and a turbine for driving a propeller 70 and its integral spinner 72. The spinner 72 carries a plurality of vortex generators 74 upstream from the propeller blades for energizing the boundary layer adjacent the surface of the spinner and for increasing the efficiency of the root section of the propeller blades. As more clearly shown in Figs. 8 and 9, the vortex generators 74 are spaced around the outer periphery of the spinner sufficiently ahead of the propeller blades 76 to insure adequate mixing of the boundary layer and main streams to reduce the effective angle of attack of the blade thereby increasing fluid flow efficiency within the entrance duct 78. Improvement of fluid flow within the duct 78 results in improved pressure recovery at the compressor blades 80. Thus it is further apparent that similar vortex generators may be utilized in the upstream stages of a multiple stage axial flow compressor to increase the efficiency of the downstream stages. It should be noted from Fig. 9 that the vortex generator 74 will not necessarily be directly in line with the propeller blades relative to the axis of fluid flow. The generators 74 may be offset, as shown, to compensate for the rotational movement of the spinner and the blades during forward movement through the air. The vortex generators 74 may all be inclined to the axis of fluid flow in the same direction to produce adjacent co-rotating vortices or they may be alternately oppositely inclined (Fig. 7) to produce adjacent counterrotating vortices.

Depending on the fluid flow characteristics, it may be further desirable to utilize vortex generators for boundary layer energization on either one or both major surfaces of a propeller shank or cuff as shown in Fig. 10. Thus the vortex generators improve flow conditions on the blade surfaces themselves and have advantageous utility not only in conjunction with a turbo-prop installation described above, but also improve the flow of cooling air in air cooled power plants especially where propeller strength requirements preclude the use of thin airfoil sections in the blade shank area or where cuffs are used. Where the fluid stream velocities are relatively high the use of vortex generators on the cuff or shank of the propeller blade will retard or eliminate fluid separation at higher blade pitch settings thereby increasing the range of pitch settings available.

Although the invention is described in connection with streamlined surfaces and airfoils utilizing vortex generators of airfoil shape which project spanwise into the fluid stream, other means can be used for obtaining trailing vortices over such fluid confining surfaces as for example the type shown in the diffuser of Fig. 11. A diffuser section 100 is shown, having a plurality of vortex generators 104 peripherally spaced about the inner walls of the diffuser at a point downstream from the entrance thereof, each of said generators being mounted on streamline struts 106 which are substantially normal to the wall of the diffuser.

The vortex generators 104 comprise vanes of airfoil shape mounted on the streamline struts 106 with their spans substantially parallel to the adjacent confining diffuser wall and their chordwise dimension inclined relative to the axis of flow. By inclining the chordwise dimension of the vortex generators 104 in the same direction, adjacent counterrotating vortices will be produced (Fig. 12). By oppositely inclining the chordwise dimension of each adjacent vortex generator 104, peripherally spaced pairs of co-rotating vortices will be produced with each adjacent pair being of opposite rotation as shown in Fig. 13. The vortex generators 104 may be utilized in place of the generators 74 (Fig. 8) on a propeller spinner as shown in Fig. 10a.

In a diffuser where entrance velocities are of high subsonic value and where transonic or supersonic velocities may be reached within the diverging portion of the diffuser, the vortex generators 104 and generators 110 and 120 of Figs. 14 and 15 are preferred to the configuration of the vortex generators 30 shown in Figs. 1 and 3.

Referring to Fig. 11, the walls of the diffuser may be of relatively high divergence wherein fluid separation occurs, for example due to local transonic or supersonic velocities, the vortex generators 106 may be inclined so that their leading edges are nearer the walls of the diffuser than the trailing edges thereof. With this inclination of the vortex generators, a certain amount of fluid will be directed toward the wall of the diffuser as a result of the high camber surface being adjacent the walls of the diffuser. The same flow will prevail where substantially symmetrical airfoil shaped vortex generators are utilized since the vanes 104 have a definite angle of attack relative to the oncoming stream. Initially, then, the region of separated flow will tend to be flattened or lessened in depth while immediately aft thereof the vortices trailing from the tips of the vortex generators 106 will tend to intermix the main fluid stream with the low velocity fluids in the separated region to recover the fluid so separated. A smooth downstream flow will then result. Should flow conditions warrant, it may be desirable to mount a plurality of sets of vortex generators either upstream or downstream from the position shown in Fig. 11 to further improve flow characteristics. The distance from the walls of the diffuser at which such additional sets of vortex generators may be positioned will depend on the growth or dissipation of the boundary layer and separated region. It should be noted that the angle of inclination of the vortex generating fins 106 is exaggerated somewhat in Fig. 11 for clarity.

Where the fluid flow characteristics in a diffuser are such that further intermixing of the main stream transversely of the duct are necessary as for example upstream or downstream from a point where the boundary layer or fluid separation is being controlled, such intermixing may be obtained by a configuration of the type shown in Figs. 11a, 12a and 13a. The vortex generating vanes 104a in these figures are mounted on a streamlined body located centrally of the diffuser or duct 100a, each having its chordwise dimension identically inclined relative to the axis of flow (Fig. 12a) or each having its chordwise dimensions oppositely inclined relative to the next adjacent vane. Where the vanes 104a are arranged as shown in Fig. 12a, i. e., producing adjacent co-rotating vortices, an oppositely rotating trailing vortex trails downstream of the streamline body as shown at 105. With the arrangement shown in Fig. 13a, adjacent counterrotating vortices are produced surrounding the periphery of the streamlined body and no trailing vortex results.

Where transonic or supersonic velocities occur, for example in a diffuser such as shown in Fig. 11, it may be necessary to utilize a vortex generating airfoil of the delta type configuration shown in Fig. 14 which airfoil is of substantially delta shape both in profile and plan form. This type of airfoil having higher critical velocities insures a positive generation of vortices from the tip thereof at sonic and near sonic speeds. In the event that it is found unnecessary to mount the vortex generators away from the wall of a duct or airfoil by means of struts, as shown in Fig. 11, it may be desirable to utilize a delta type airfoil 120 as shown in Fig. 15. The airfoil 120 is similar to a half span of the airfoil 110 of Fig. 14 and may be mounted to a confining surface 122 so that it projects spanwise through the boundary layer and terminates in a vortex producing tip adjacent the imaginary line separating the boundary layer and main stream. An airfoil of this configuration (120) also produces an effect similar to that produced by the airfoil 110 thereby vortex generation is insured in transonic or sonic velocities.

Vortex generators which produce adjacent co-rotating or counterrotating vortices may be utilized as shown in Figs. 16 and 17 to energize the boundary layer and eliminate separation on the upper and lower surfaces of the wing 130 of an aircraft while other vortex generators 140 may be utilized on the merging surfaces of an aircraft fuselage 146 and the main wing 130 to reduce or eliminate fluid flow interference in such areas and thereby reduce drag.

There are of course obvious limits as to the effect of vortex generators of this type depending upon flow conditions. Thus for given conditions where separation is likely to occur the generators will be utilized upstream of such point to energize the boundary layer and delay separation. Then, with additional downstream generators the boundary layer energized flow can be maintained well downstream of the surface. Of course the usual separation which normally occurs at the extreme trailing edge of a wing for example would continue to exist but such separation is normally not referred to as actual separation in the ordinary sense. This is true even though usual separation in subsonic flow begins at the trailing edge of a wing or other similar surface and moves upstream with increased angle of attack or similar flow variation.

Figs. 18 and 19 illustrate the use of vortex generators having high critical velocities (i. e., airfoils 110 and 120 of Figs. 14 and 15) to delay or recover fluid separation due to normal shock, i. e., a shock produced at near sonic speeds at a locale, for example, above the wing 150 wherein the velocity of fluid moves from a subsonic to a supersonic region. Referring to Fig. 19, an airfoil 150 is shown which may be moving through a fluid having relatively near sonic velocity over the top surface thereof. Even where the main fluid stream is below sonic speeds local velocities may reach Mach number 1 inasmuch as the fluid flowing over the upper surface of the airfoil must travel a greater distance than the fluid flowing beneath the airfoil whether resulting from the angle of attack of a substantially symmetrical airfoil or from the high camber on the upper surface of a conventional airfoil. Sonic or supersonic velocities may be reached at some local point above the airfoil thereby producing a vertical shock wave (Figs. 18 and 19) which is substantially narrow, i. e., its dimension along the axis of fluid flow is very small. A shock of the type shown is a normal shock as distinguished from shock waves occurring well above sonic speed and wherein the shock may assume a swept-back configuration. Due to the static pressure rise in this shock wave, a barrier is produced so that fluid separation may occur immediately downstream of the shock. In other words, an adverse pressure gradient is produced which has a further retarding effect on the retarded velocities in the boundary layer. Thus separation occurs when the boundary layer contains insufficient energy to proceed against the rising pressure.

In order to eliminate or recover fluid separation or both under these conditions, a plurality of delta type airfoils 160 are spaced spanwise along and adjacent to the leading edge of the wing or airfoil 150. The airfoils 160 project spanwise into the fluid stream terminating in tips adjacent the line separating the main stream and the boundary layer and have their chordwise dimensions set at an angle to the oncoming stream whereby a plurality of vortices are produced from the tips thereof to transfer energy from the main stream to the retarded boundary layer. By adding energy to the fluid adjacent the confining surface the flow is aided in moving past the adverse pressure gradient of the shock. Where the adverse pressure gradient is sufficiently large to cause separation a plurality of vortex generators 170 are mounted downstream of the shock on streamline struts 172 so that their spans are substantially parallel to the plane of the main wing and their chordwise dimension is inclined relative to the axis of flow. The struts 172 are of sufficient length so that adjacent counterrotating vortices are produced from the tips of the vortex generators 170 immediately adjacent the main stream and the region of separated flow. In this manner sufficient energy is transferred from the main fluid stream to the region of separated flow thereby increasing the velocity of the latter and recovering the separation. Although a small amount of energy from the main stream is expended in obtaining such energization of the boundary layer and separated regions, the total energy of the entire stream remains substantially constant while the total efficiency of the wing is increased under the above described conditions of flow. It may be desirable to provide mechanism for retracting and extending the vortex generators when mounted on the wing of an aircraft as shown in Figs. 16, 17, 19 and 20 so that proper control of the boundary layer may be maintained over a wide range of operating conditions. Thus at high angles of attack such as in landing the vortex generators of Fig. 16 could be extended sufficiently to insure steady flow over the airfoil thereby reducing the stalling speed of the wing. In thin, high speed airfoils where wing loadings are apt to be high, stalling speeds are usually inherently high and use of retractable vortex generators aids immeasurably in maintaining control at slower speeds and in increasing safety.

As a result of this invention it is readily apparent that improved means have been provided for transferring energy from a main fluid stream to the slow moving boundary layer over a confining surface to entrain the latter which when utilized in connection with a wind tunnel fan or propeller blades and the like improves the efficiency of the latter.

What is desired by Letters Patent is:

In combination, a fluid confining duct, a rotatable fan, means supporting said fan from the wall of said duct, said fan including a hub and a plurality of blades, said blades having root sections and main sections terminating in tips adjacent the wall of said duct, a streamlined body forward of said fan for directing a fluid stream in said duct around said hub and through said blades, turning vanes fixedly supported from the wall of said duct and connected to said body, means for increasing the overall efficiency of said propeller including a plurality of fins of airfoil shape carried by said body and the duct wall and exposed to the fluid stream, said fins being located between said turning vanes and downstream of the 50% chordwise location of said turning vanes and terminating in vortex producing tips adjacent the common surface between the main and boundary layer streams for intermixing fluid particles having varied energy levels between said streams, adjacent fins having their chords oppositely inclined relative to the axis of flow of the main stream whereby adjacent counterrotating vortices are produced.

HENRY H. HOADLEY.

References Cited in the file of this patent

UNITED STATES PATENTS

| Number | Name | Date |
|---|---|---|
| 1,370,083 | Blackmore | Mar. 1, 1921 |
| 1,425,922 | Wesnigk | Aug. 15, 1922 |
| 2,041,793 | Stalker | May 26, 1936 |
| 2,194,890 | Seversky | Mar. 26, 1940 |
| 2,260,786 | Muhlenbruck | Oct. 28, 1941 |
| 2,472,357 | Wolf | June 7, 1949 |
| 2,558,816 | Bruynes | July 3, 1951 |

FOREIGN PATENTS

| Number | Country | Date |
|---|---|---|
| 326,857 | Germany | Oct. 4, 1920 |
| 504,214 | Great Britain | Apr. 21, 1939 |
| 555,646 | Great Britain | Sept. 1, 1943 |
| 606,119 | Germany | Nov. 24, 1934 |
| 668,099 | France | July 2, 1929 |